United States Patent [19]

Matsuoka

[11] Patent Number: 5,363,257
[45] Date of Patent: Nov. 8, 1994

[54] APPARATUS FOR TAPE LOADING DEVICE

[75] Inventor: Hidetoshi Matsuoka, Sekimachi-higashi, Japan

[73] Assignee: Canon Kabushiki Kaisha, Tokyo, Japan

[21] Appl. No.: 970,843

[22] Filed: Nov. 3, 1992

[30] Foreign Application Priority Data

Nov. 29, 1991 [JP] Japan .................................. 3-340004

[51] Int. Cl.$^5$ ............................................ G11B 15/66
[52] U.S. Cl. ..................................................... 360/85
[58] Field of Search ............................... 360/85, 84, 95

[56] References Cited

U.S. PATENT DOCUMENTS 4,620,245 10/1986 Shimizu ................................. 360/85
5,153,790 10/1992 Kobayashi et al. ................... 360/85

Primary Examiner—John H. Wolff
Attorney, Agent, or Firm—Fitzpatrick, Cella, Harper & Scinto

[57] ABSTRACT

A tape loading device includes a drum base, a rotary head drum mounted on the drum base, and a loading ring rotatably supported on the drum base. The tape loading device loads a tape on a predetermined tape path by the movement of a loading post which is achieved by the rotation of the loading ring. The loading ring has a plurality of protruding portions on an inner peripheral surface thereof. The protruding portions protrude in a radial direction. The drum base has a groove portion on an outer peripheral portion thereof which engages with the plurality of protruding portions and thereby rotatably supports the loading ring.

16 Claims, 5 Drawing Sheets

APPARATUS FOR TAPE LOADING DEVICE

BACKGROUND OF THE INVENTION

1. Field of the Invention

The present invention relates to a tape loading device suitable for use in VTRs (Video Tape Recorders), and more particularly, to a tape loading device designed to load a tape in a predetermined running path by the movement of a loading post which is achieved by the rotation of a loading ring.

2. Description of the Related Art

A tape loading device for use in conventional VTRs has the structure shown in, for example, FIG. 1. That is, first and second loading rings 71 and 72 are mounted on a drum base 73 on which a rotary head drum 20 is mounted. A post base 74 (on which a loading post 74a is mounted) is moved to a predetermined position along a guide member 77 by the rotation of the first ring 71 while post bases 75 and 76 (with loading posts 75a and 76a respectively mounted thereon) are moved to predetermined positions along a guide member 78 by the rotation of the second ring 72, whereby a tape 21 is pulled out from a tape cassette (not shown) and is then loaded in a predetermined running path including the peripheral surface of the rotary head drum 20.

Also, the drum base 73 has three shafts 70 planted on the lower portion thereof. Three rollers 79a through 79c and three rollers 79d through 79f rotatably supported on the shafts 70 retain the inner peripheral surfaces of the first and second rings 71 and 72 and thereby rotatably support the first and second rings 71 and 72 on the drum base 73.

Even if the rings 71 and 72 are disposed on a chassis on which the drum base is mounted (alternately, on a chassis formed integrally with the drum base) and are substantially rotatably mounted on the drum base, the same rollers and shafts as those described above are used.

However, in the aforementioned conventional loading device, rotatable retention of the ring 71 (72) requires at least the three rollers 79a through 79c (79d through 79f), three shafts 70 for rotatably supporting the rollers 79a through 79c (79d through 79f), and fixing members, such as mold washers and screws. Thus, the number of parts required is greatly increased, increasing the cost of the VTR.

Furthermore, the increased number of parts and the mounting of the ring 71 (72) on the three rollers 79a through 79c (79d through 79f) make the assembly work of the VTR very complicated.

In addition, since a burr generated on the inner peripheral portion of the ring 71 (72) during pressing of the ring 71 (72) may damage the rollers 79a through 79c (79d d through 79f) while the ring 71 (72) is rotated, burrs must be removed over substantially the entire circumference of the inner peripheral portion. However, this burr removing work is very troublesome.

SUMMARY OF THE INVENTION

It is an object of the present invention to provide a tape loading device of the type in which a loading ring is rotatably mounted on a drum base, which enables the number of parts and the cost of parts to be greatly reduced, and which enables the assembly work and burr removing work to be easily performed.

To achieve the aforementioned object, the present invention provides a tape loading device which comprises a drum base having a circular guide groove on an outer peripheral portion, a rotary head drum rotatably mounted on the drum base, a loading ring having a plurality of protruding portions on an inner peripheral portion thereof, the protruding portions protruding in a radial direction of the loading ring, the loading ring being rotatably mounted on the drum base by the engagement of the plurality of protruding portions with the guide groove in the drum base, and a loading post which moves by the rotation of the loading ring and thereby loads a tape in a predetermined running path including a peripheral surface of the rotary head drum.

In the present invention, the loading ring can be rotatably and readily supported on the drum base without requiring a large number of parts, such as rollers, by engaging the plurality of protruding portions on the inner peripheral portion of the loading ring with the groove portion in the outer peripheral portion of the drum base.

Since the support of the loading ring is achieved by the engagement of the protruding portions with the groove portion, only the specific portion, such as the distal end, of each of the protruding portions makes contact with and slide against the groove portion during the rotation of the loading ring.

According to a first aspect of the present invention, a video tape recorder apparatus comprises a drum base having a circular guide groove therein. A rotary head drum is provided having at least one head thereon, the drum being rotatably mounted on the drum base. A loading ring is provided having a plurality of protruding portions disposed on an inner peripheral portion thereof. The protruding portions protrude in a radial direction of the loading ring. The loading ring is rotatably mounted on the drum base by the engagement of the plurality of protruding portions with the guide groove on the drum base. A loading post is provided which is caused to moved by the rotation of the loading ring to load a tape in a predetermined tape path which includes a peripheral surface of the rotary head drum.

According to another aspect of the present invention, a tape loading device comprises a base having a cylindrical portion with a guide portion provided on an outer periphery thereof. A loading ring is provided having an engaging portion on an inner peripheral portion thereof, the engaging portion engaging the guide portion. A guide post is provided coupled to the loading ring, the guide post moving together with the tape, in accordance with a rotation of the loading ring, to form a predetermined tape path.

Other objects and features of this invention will become apparent from the following detailed description of embodiments thereof taken in conjunction with the accompanying drawings.

DETAILED DESCRIPTION OF THE PREFERRED EMBODIMENTS

Figure 1:
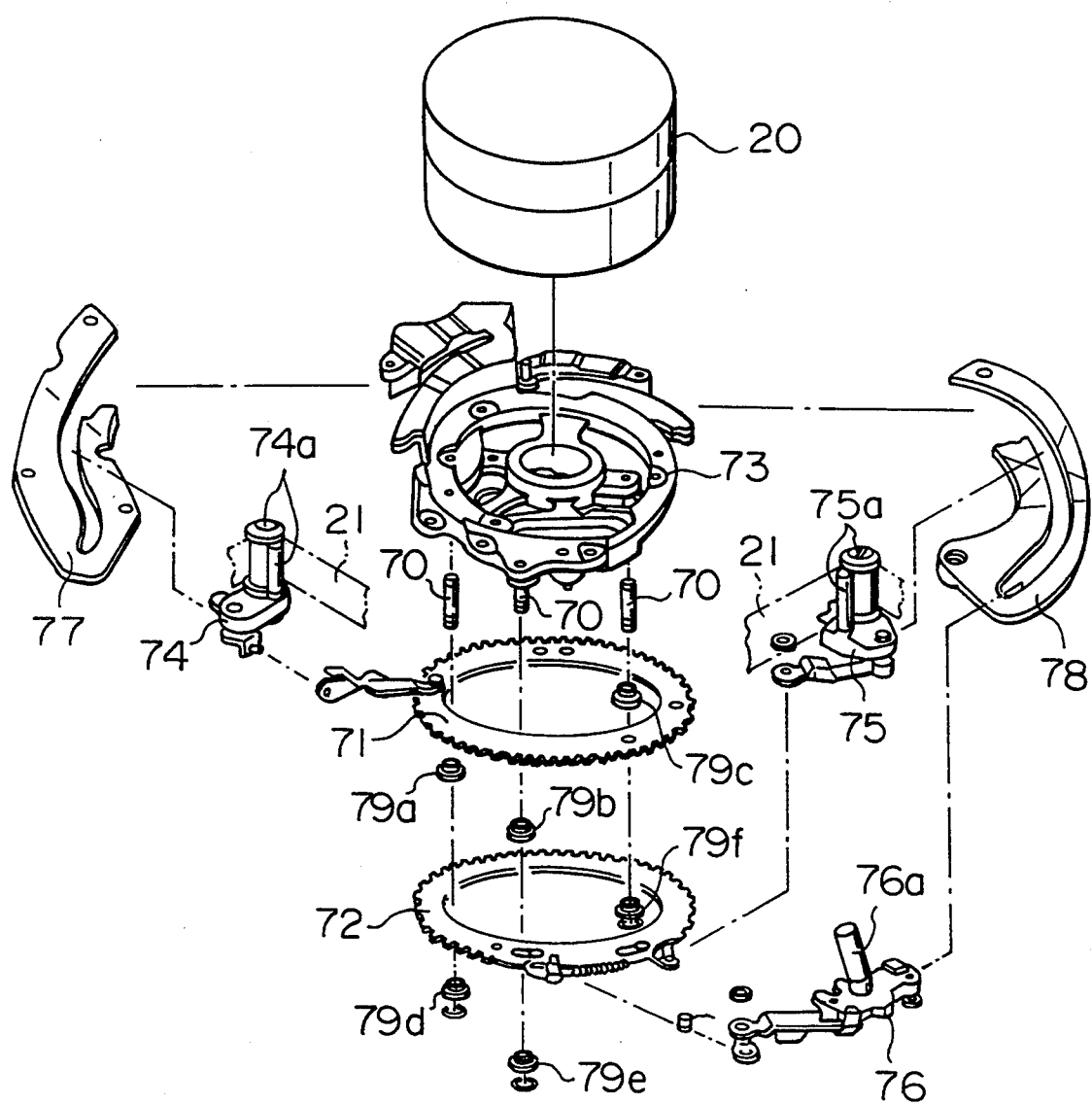
FIG. 1 is an exploded perspective view of a conventional tape loading device.
Figure 2:
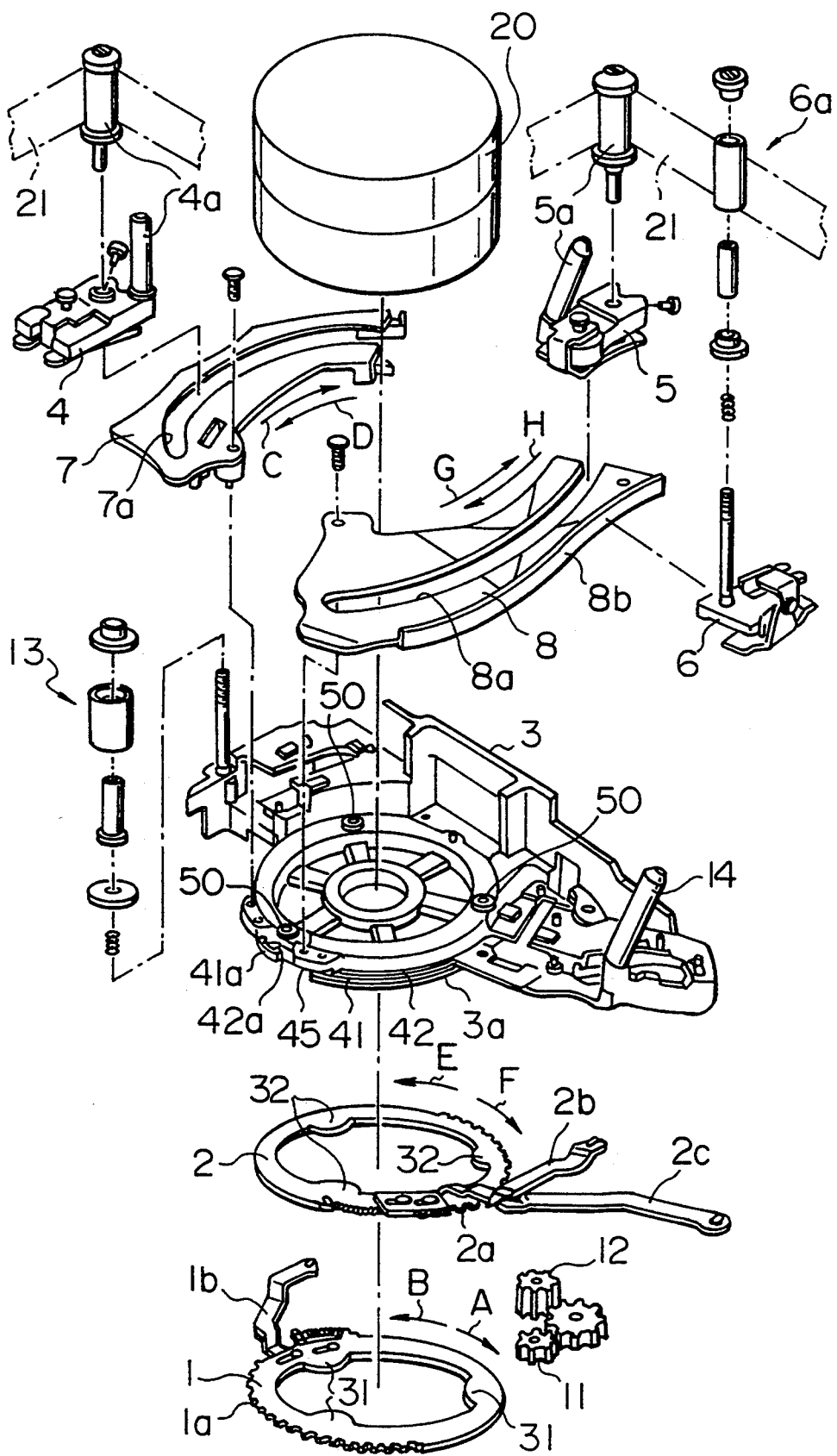
FIG. 2 is an exploded perspective view showing an embodiment of the present invention which is applied to a tape loading device for VTRs.
Figure 3:
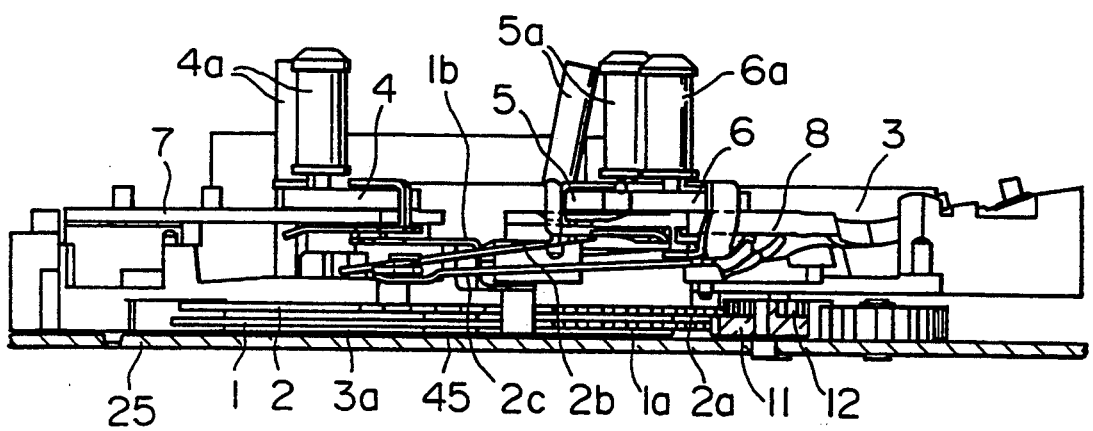
FIG. 3 is a side elevational view of the device of FIG. 2.

An embodiment of the present invention which is applied to a tape loading device for VTRs will be described below with reference to FIGS. 2 through 7. As shown in FIGS. 2 and 3, first and second loading rings 1 and 2 can be mounted on the lower portion of a drum base 3 on which a rotary head drum 20 is mounted. The first ring 1 has a toothed portion 1a on an outer peripheral portion thereof. When the first ring 1 is rotated in directions indicated by arrows A and B by a driving gear 11 engaging with the toothed portion 1a, an arm 1b of the first ring 1 moves a post base 4 along a guide groove 7a of a guide member 7 in directions indicated by arrows C and D.

The second ring 2 has a toothed portion 2a on an outer peripheral portion thereof. The second ring 2 is rotated in directions indicated by arrows E and F which are opposite to directions A and B in which the first ring 1 is rotated by a driving gear 12 engaging with the toothed portion 2a. At that time, arms 2b and 2c of the second ring 2 move post bases 5 and 6 along a guide groove 8a and a guide rail 8b of a guide member 8, respectively, in directions indicated by arrows G and H.

Consequently, loading posts 4a, 5a and 6a respectively mounted on the post bases 4, 5 and 6 move back and forth between a tape pulling out position where they pull out the tape 21 from a tape cassette (not shown) and a loading completing position where they thread the tape 21 which has been pulled out along a predetermined running path including the peripheral surface of the rotary head drum 20.

As shown in FIGS. 2 and 5 through 7, the first and second rings 1 and 2 have three protruding portions 31 and 32, respectively, on the inner peripheral portions thereof. The protruding portions 31 and 32 are disposed equidistantly around the inner peripheral portions and protrude in the radial direction. The protruding portions 31 and 32 engage with circumferential groove portions 41 and 42 formed on the lower portion of the drum base 3, respectively, the groove portions 41 and 42 (described in detail later), whereby the rings 1 and 2 are rotatably supported on the drum base 3. The distal end portion of each of the protruding portions 31 and 32 is formed in an arcuate (convex) form, while the upper and lower surfaces of each of the protruding portions 31 and 32 are each curved in an arcuate form (pinched toward the distal end) so as to facilitate the engagement of the protruding portions 31 and 32 into the groove portions 41 and 42.

As shown in FIGS. 2 and 4 through 7, the drum base 3 has a cylindrical ring mounting portion 3a on the lower portion thereof. The portion 3a is formed integrally with the drum base 3. On the outer peripheral portion of the ring mounting portion 3a are formed two groove portions 41 and 42 to rotatably support the first and second rings 1 and 2 on the drum base 3. On the outer peripheral portion of the ring mounting portion 3a are also formed three introducing or recessed portions 45 which are open outwardly and downwardly. The recessed portions 45 each have an arcuate (concave) form so that they match the protruding portions 31 and 32 of the rings 1 and 2. The recessed portions 45, which are notches partially formed on the lower surfaces of the groove portions 41 and 42, form introducing portions 41a and 42a into which the protruding portions 31 and 32 are placed so that they may be inserted into the groove portions 41 and 42, respectively.

Figure 6:
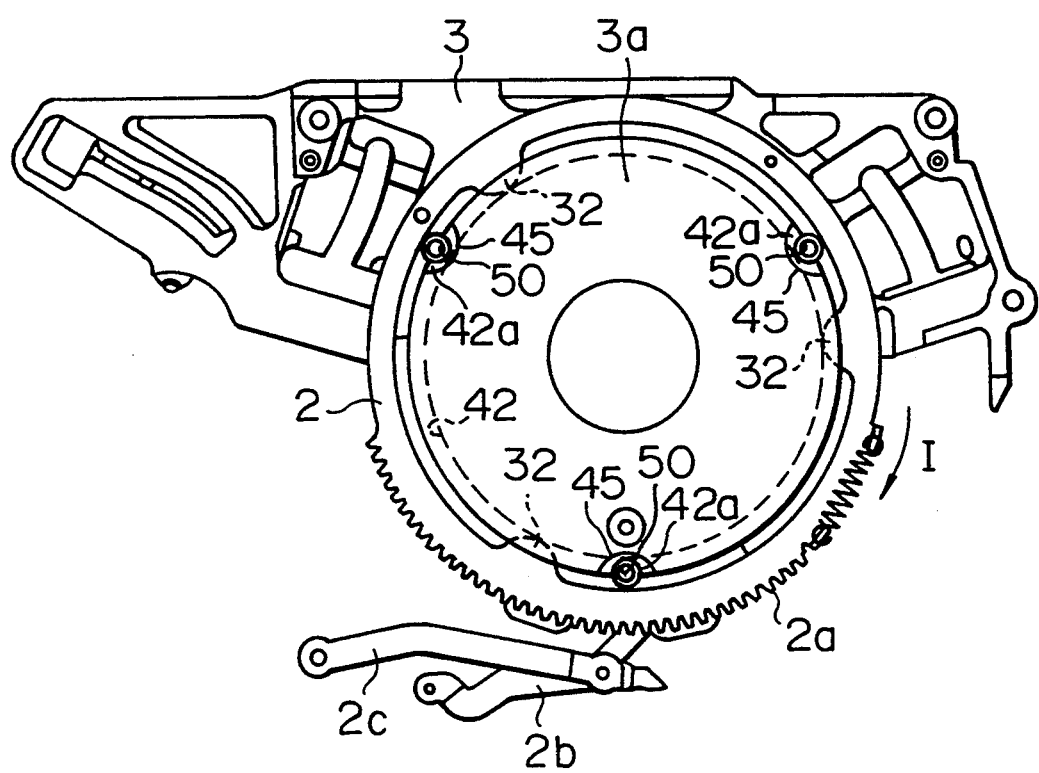
FIG. 6 is a bottom view illustrating the assembly of the ring on the drum base.

As shown in FIGS. 2 and 6, a screw inserting hole 50 is provided above each of the recessed portions 45 (which constitute the introducing portions 41a and 42a) for tightening (for example, screwing) the rotary head drum 20 on the drum base 3.

As shown in FIG. 2, on the upper surface of the drum base 3 are mounted a vertical guide post 13 and an inclined guide post 14. In addition, positioning portions for positioning the post bases 4, 5 and 6 are also formed on the upper surface of the drum base 3 integrally therewith.

The assembling operation of the first and second loading rings 1 and 2 on the drum base 3 will be described below with reference to FIGS. 4 through 7.

Figure 4:
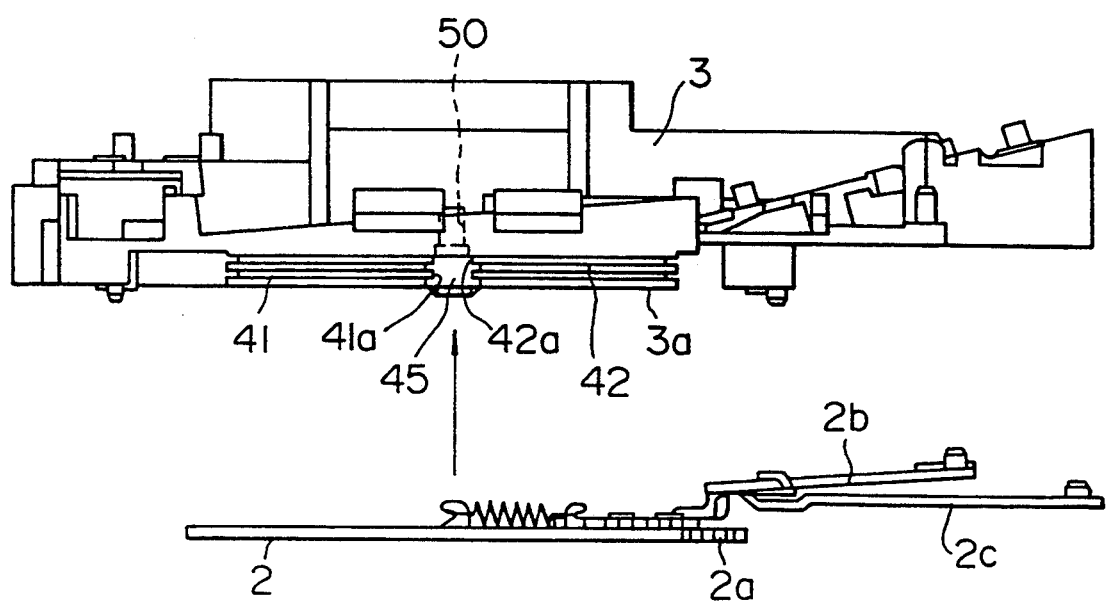
FIG. 4 is a side elevational view illustrating the assembly of a ring on a drum base.
Figure 5:
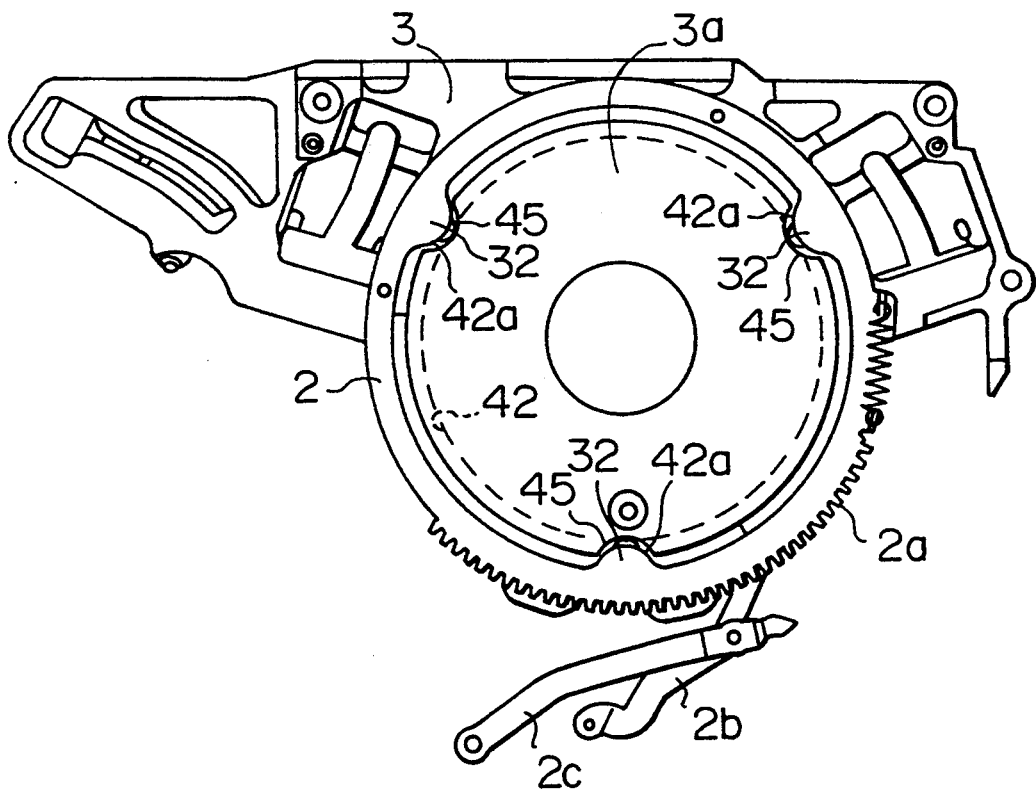
FIG. 5 is a bottom view illustrating the assembly of the ring on the drum base.

After the ring 2 is positioned below the ring mounting portion 3a of the drum base 3 such that the three protruding portions 32 of the ring 2 respectively oppose the three recessed portions 45 of the ring mounting portion 3a, the ring 2 is relatively fitted onto the outer side of the ring mounting portion 3a (see FIGS. 4, 5 and 7(a)).

Figure 7:
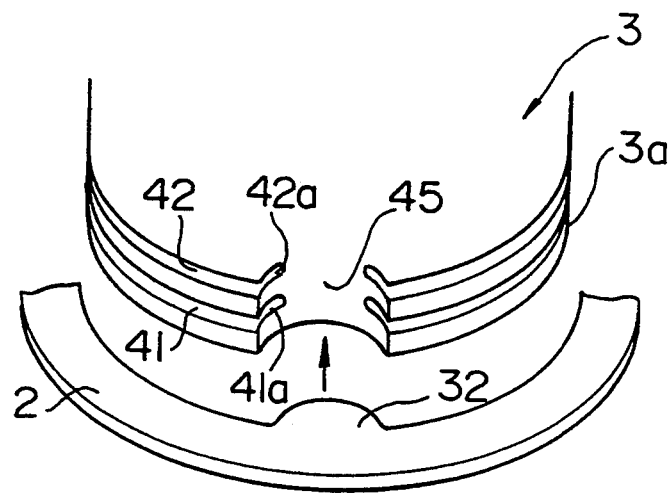
FIG. 7(a–c) is a perspective view illustrating the assembly of the ring on the drum base.
Figure 7B:
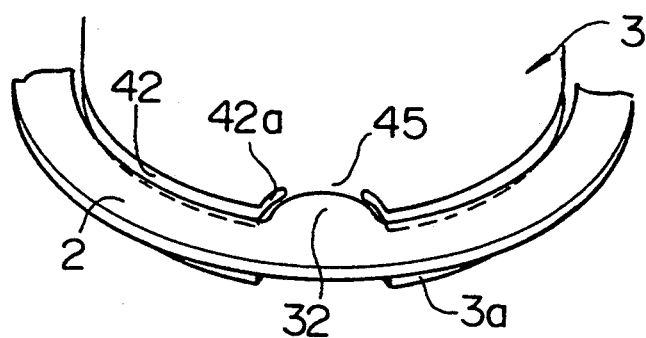
Figure 7C:
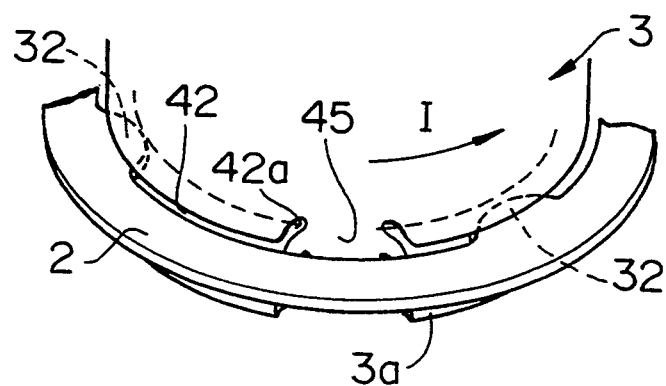

When the ring 2 has been moved to a position where the protruding portions 32 of the ring 2 face the corresponding introducing portions 42a of the groove portion 42, as shown in FIG. 7(b), the ring 2 is pivoted in a direction indicated by an arrow I (or in an opposite direction), as shown in FIGS. 6 and 7(c), so as to insert the protruding portions 32 into the groove portion 42 and thereby rotatably support the ring 2 on the drum base 3.

After the ring 2 has been mounted in the manner described above, the ring 1 is rotatably supported on the drum base 3 in the same manner as that of the ring 2 by inserting the protruding portions 31 into the groove portion 41 from the corresponding introducing portions 41a.

Thus, the rings 1 and 2 can be readily supported on the drum base 3 in such a manner as to be rotatable only by inserting the protruding portions 31 and 32 of the rings 1 and 2 into the groove portions 41 and 42 of the ring mounting portion 3a from the introducing portions 41a and 42a, respectively. Also, the rings 1 and 2 can be readily removed from the drum base 3 by performing the aforementioned operation reversely.

After the rings 1 and 2 have been mounted, as shown in FIGS. 2 and 6, the rotary head drum 20 (the fixed drum side thereof) is screwed on the upper surface of the drum base 3 by threading screws (not shown) into the screw inserting holes 50 provided above the recessed portions 45.

In this embodiment, since the screwing insert holes 50 are provided above each of the recessed portions 45, it is possible to insert a screw and the distal end portion of a screw driver into a gap between each of the recessed portions 45 and the ring 1 or 2 (see FIG. 6) by utilizing each of the introducing portions 41a and 42a (which are the notches in the groove portions 41 and 42) to screw the drum base 3. Thus, the rotary head drum 20 can be readily mounted on the drum base 3 and removed from the drum base 3 even after the rings 1 and 2 have been mounted on the drum base 3 regardless of the rotated position of the rings 1 and 2.

The drum base 3 with the rings 1 and 2 supported thereon and with the rotary head drum 20 mounted thereon is mounted on a chassis 25, as shown in FIG. 3. In a normal operation state, the rings 1 and 2 are rotated in the manner described above for loading and unloading the tape.

The rotation angle of the rings 1 and 2 in a normal operation is set to a value which is less than a value at which the protruding portions 31 and 32 are in phase with the recessed portions 45. Thus, meeting of the protruding portions 31 and 32 with the recessed portions 45 and the resultant disengagement of the protruding portions 31 and 32 from the groove portions 41 and 42 are avoided.

Since the distal end portion of each of the protruding portions 31 and 32 has an arcuate form, the sliding resistance between the groove portions 41 and 42 and the protruding portions 31 and 32 is very low. This makes smooth rotation of the rings 1 and 2 possible. To reduce the sliding resistance, the drum base 3 is made of a molded product whose composition includes carbon, and the rings 1 and 2 are made of iron in this embodiment.

Furthermore, since the rings 1 and 2 are supported by the engagement of the protruding portions 31 and 32 with the groove portions 41 and 42 and only the specific portion, such as the distal end, of each of the protruding portions 31 and 32 makes contact with and slides against the groove portion 41 or 42 during the rotation of the rings 1 and 2, removal of burrs (generated during the pressing of the rings 1 and 2) only on that specific portion is enough.

For example, although there are a plurality of introducing portions in each of the groove portions from which a plurality of protruding portions are fitted into the groove portion in the above embodiment, provision of the introducing portions may be eliminated in, for example, a structure in which plate members having different diameters are laid on top of one another to substantially provide a groove portion and in which a loading ring is mounted when the plate members are laid on top of one another.

Furthermore, although the ring has three protruding portions in this embodiment, it may have four or more protruding portions. If the protruding portion is one which is elongated in the circumferential direction, the provision of only two protruding portions may be enough. In these cases, the introducing portions (the recessed portions) are formed in the groove portion in a number and at positions which correspond to those of the protruding portions.

In the above embodiment, the rotation angle of the ring in a normal operation is set to a value which is less than the value at which the protruding portions are in phase with the introducing portions (the recessed portions) to avoid disengagement of the protruding portions from the groove portion. However, it may also be arranged such that a grooved engaging portion (to be engaged with each of the introducing portions when the drum base is assembled on the chassis) is provided on the chassis to prevent disengagement of the protruding portions even when the rotational angle of the ring is large.

The protruding portions of the ring and the groove portions of the drum base can have any structure if that structure assures that each of the protruding portions can substantially engage with the groove portion. For example, it is not necessary to make the length of each of the protruding portions shorter than that of the groove portion in the circumferential direction, as in the case of the embodiment.

As will be understood from the foregoing description, in the embodiment, the loading ring can be rotatably supported on the drum base by engaging the plurality of protruding portions on the inner peripheral portion of the loading ring with the groove portion on the outer peripheral portion of the drum base. Thus, the rollers, the shafts for rotatably supporting the rollers, and the fixing members (such as molded washers and screws), which would be required in a conventional device, are not necessary. Consequently, the number of parts and the cost for parts are greatly reduced, and the assembly work is greatly simplified.

Furthermore, the support of the loading ring is achieved only by the engagement of the protruding portions with the groove portion, and only the specific portion, such as the distal end, of each of the protruding portions makes contact with and slides against the groove portion. Therefore, removal of burrs (generated during the pressing of the loading ring) only on that specific portion is enough. Also, the burr removing work can be performed very effectively.

Since the groove portion has a plurality of introducing portions from which the plurality of protruding portions are fitted into the groove portion, the loading ring can be supported on the drum base by aligning the protruding portions with the introducing portions and then by rotating the loading ring. Thus, the assembly work is further simplified.

Since the introducing portions are constituted by recessed portions formed on the outer peripheral portion of the drum base, and since the rotary head drum tightening positions are set at the recessed portions, the introducing portions can be utilized as inserting portions through which screws and tools can be inserted for tightening (for example, screwing) the rotary head drum onto the drum base. Thus, the rotary head drum can be mounted on or removed from the drum base even after the loading ring has been mounted on the drum base regardless of the rotated position of the loading ring.

Furthermore, since the sliding portion of each of the protruding portions which makes contact with and slides against the groove portion has an arcuate form, the sliding resistance between the groove portion and the protruding portions can be greatly reduced. This makes smooth rotation of the loading ring possible.

The individual components shown in outline or designated by blocks in the Drawings are all well-known in the tape loading arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video tape recorder apparatus comprising:
a drum base having a first circular guide groove lying in one plane therein;
a rotary head drum having at least one head thereon, said rotary head drum being mounted on said drum base;

first rotating means for rotating said rotary head drum;

a first loading ring having a plurality of first protruding portions disposed on an inner peripheral portion thereof, said first protruding portions protruding in a radial direction of said first loading ring, said first loading ring being rotatably mounted on said drum base by the engagement of said plurality of first protruding portions with said first circular guide groove of said drum base;

second rotating means for rotating said first loading ring; and a loading post which is moved by the rotation of said first loading ring to load a tape in a predetermined tape path which includes a peripheral surface of said rotary head drum.

2. An apparatus according to claim 1, wherein a portion of each of said first protruding portions which makes contact with and slides against said first guide groove has an arcuate form.

3. An apparatus according to claim 1, wherein said first guide groove has a plurality of introducing portions into which said plurality of first protruding portions are fitted to insert said first protruding portions into said first guide groove.

4. An apparatus according to claim 3, wherein a number of said first protruding portions is the same as a number of said introducing portions.

5. An apparatus according to claim 4, wherein both the number of said first protruding portions and the number of said introducing portions are three.

6. An apparatus according to claim 4, wherein a rotational angle of said first loading ring is set in such a manner that rotation of said loading ring does not cause said first protruding portions to become aligned with said introducing portions.

7. An apparatus according to claim 3, wherein said drum base has a plurality of rotary head drum mounting portions respectively mounted above said plurality of introducing portions.

8. An apparatus according to claim 1, further comprising:

a second circular guide groove provided on said drum base;

a second loading ring having a plurality of second protruding portions disposed on an inner peripheral portion thereof, said plurality of second protruding portions protruding in a radial direction of said second loading ring. said second loading ring being rotatably mounted on said drum base by the engagement of said plurality of second protruding portions with said second circular guide groove of said drum base; and means for rotating said second loading ring.

9. An apparatus according to claim 8, wherein said first and said second loading rings are rotated in different directions.

10. An apparatus according to claim 1, wherein said drum base comprises a molded product, and wherein said first loading ring is made of a metal.

11. A tape loading device comprising: a base having a cylindrical portion with a guide portion provided on an outer periphery thereof and lying in one plane;

a first loading ring having an engaging portion on an inner peripheral portion thereof, said engaging portion engaging said guide portion;

means for rotating said first loading ring; and a guide post coupled to said first loading ring, said guide post moving in accordance with a rotation of said first loading ring, to form a predetermined tape path.

12. A device according to claim 11, wherein said guide portion comprises a groove, and wherein said engaging portion comprises a protruding portion formed on said first loading ring.

13. A device according to claim 12, further comprising a second protruding portion provided on said first loading ring.

14. A device according to claim 13, wherein said guide groove has a plurality of introducing portions into which said plurality of protruding portions are fitted to insert said plurality of protruding portions into said guide groove.

15. A device according to claim 12, further comprising a second loading ring and a second guide groove and means for rotating said second loading ring.

16. A device according to claim 15, wherein said first and said second loading rings are rotated in different directions.

* * * * *

UNITED STATES PATENT AND TRADEMARK OFFICE
CERTIFICATE OF CORRECTION

PATENT NO. : 5,363,257          Page 1 of 2
DATED : November 8, 1994
INVENTOR(S) : HIDETOSHI MATSUOKA It is certified that error appears in the above-indentified patent and that said Letters Patent is hereby corrected as shown below:

COVER PAGE

Column 1, Item [75]

Inventor line, "Sekimachi-higashi," should read --Tokyo,--.

Column 2, Item [57]

Line 1, ".includes" should read --includes--.

Column 1

Line 55, "d through" should read --through--.

Column 2

Line 59, "device; FIG. 2" should read --device; ¶ FIG. 2--.
    Line 63, "VTSs; FIG. 3" should read --VTRs; ¶ FIG. 3--.
    Line 64, "FIG. 2; FIG. 4" should read --FIG. 2; ¶ FIG. 4--.
    Line 65, "base; FIG. 5" should read --base; ¶ FIG. 5--.
    Line 67, "base; FIG. 6" should read --base; ¶ FIG. -6--.
    Line 68, "base; FIG. 7(a-c)" should read --base; ¶ FIG. 7(a-c)--.

UNITED STATES PATENT AND TRADEMARK OFFICE
CERTIFICATE OF CORRECTION

PATENT NO. : 5,363,257 Page 2 of 2

DATED : November 8, 1994

INVENTOR(S) : HIDETOSHI MATSUOKA

It is certified that error appears in the above-indentified patent and that said Letters Patent is hereby corrected as shown below:

<u>Column 3</u>

Line 8, "7. As" should read --7. ¶ As--.
    Line 11, "mounted. The" should read --mounted. ¶ The--.

<u>Column 8</u>

Line 5, "ring." should read --ring,--.
    Line 17, "comprising: a base" should read --comprising: ¶ a base--.

Signed and Sealed this

Twenty-seventh Day of June, 1995

Attest:

BRUCE LEHMAN

Attesting Officer      Commissioner of Patents and Trademarks